ACCELERATION CONTROL CHARACTERISTICS PLOTTED FOR A STEP INTO AMPLIFIER A3

DECELERATION CONTROL CHARACTERISTICS PLOTTED AGAINST POSITION ERROR

*FIG.6.*

United States Patent Office 3,351,213
Patented Nov. 7, 1967

3,351,213
CONTROL SYSTEMS
William Maxwell Newman, London, and Graham Arthur Forster, Sheffield, England, assignors to Davy and United Instruments Limited, Sheffield, England
Filed Dec. 7, 1965, Ser. No. 512,120
Claims priority, application Great Britain, Dec. 8, 1964, 49,910/64
22 Claims. (Cl. 212—39)

ABSTRACT OF THE DISCLOSURE

The invention is concerned with the problem of controlling the position in height and traverse of a suspended body, particularly a grab suspended from a traveller, in order to bring the carriage and suspended body simultaneously to rest, with substantially zero swing of the suspended body. This aim is achieved by controlling the acceleration and deceleration of the carriage and the raising and lowering of the suspended body relative to the carriage in predetermined speed patterns designed to damp any swing of the body that might occur.

---

This invention relates to automatic control systems for conveying devices, such as overhead cranes and ore and similar unloaders, in which a body, such as a grab or a hook, is suspended from suspension means which can be moved along a fixed path which has at least a significant component in the horizontal direction in order to traverse the holding device. Such a conveying device will be referred to hereinafter as "a conveying device of the type described." Preferably, the holding device may additionally be raised and lowered relative to the suspension point.

In specification No. 12,714/63, there is described as system for operating an ore unloader or like device for moving material from a first disposition, such as the hold of a ship, to a second disposition, such as a hopper. The system operates to cause material to be grabbed from the first disposition in a pre-programmed pattern and to control automatically the movement of the grab between the two dispositions, therefore removing from the operator a large part of the labour of controlling the unloader.

One problem associated with the control of an ore unloader, or indeed of any conveying device of the type described, is to control the swing of the grab, or other holding device, set up on the random acceleration or deceleration of the traverse. While the transverse speed and position of the suspension point is readily controlled either manually or automatically, the swing of the holding device renders it difficult to predict the transverse position of the holding device at any time. In manually controlled systems, therefore, only the skill of the operator can prevent the grab from striking the ship's sides in unloading and its incorrect discharge at the hopper.

The present invention provides, in one aspect, an automatic control system for controlling the movement of the suspension means of a suspended body along a given path including means for automatically controlling the speed of movement of said suspension means to change such speed from a first speed to a second speed in accordance with a pattern of speed change so related to the swing period of the suspended body that, when the suspension means attains said second speed, the body is moving at substantially zero angular velocity thereby avoiding swing of said body relative to said suspension means in the direction of movement of said suspension means upon attaining said second speed.

In this way, the suspended body, which is the grab, or other holding device, emerges from traverse acceleration or deceleration with substantially zero swing so that it may accurately be located where required.

When the suspension means is at a constant height below the suspension point along the fixed path, the acceleration or deceleration may be effected in a single period equal to the swing period of the suspended body or an integral multiple of the swing period. Alternatively, the acceleration or deceleration may be effected in two or more periods, separated by an interval or intervals at a different acceleration or deceleration or at constant velocity; the interval or intervals are selected according to the acceleration period and the swing period of the suspended body to result in zero swing of that body.

When the suspended body is to be lowered or raised during acceleration or deceleration, the acceleration or deceleration of the suspension means is effected in two or more periods, separated by intervals at constant speed or at a different acceleration or deceleration, and the variation in height of the suspended body is performed in a constant pattern to which the acceleration periods and the intervals are related. The duration of the intervals is chosen to achieve substantially zero swing at the conclusion of acceleration or deceleration.

Where the suspended body is to be moved from a stationary position at one height to a second stationary position at another height, it is desirable for speed of operation to accelerate to maximum traversal speed as quickly as possible and similarly to decelerate as quickly as possible. In order to achieve substantially zero swing at the conclusion of acceleration and of deceleration, while permitting variation in the traversal distance, it is preferred to effect acceleration and deceleration in constant patterns regardless of variation in traversal distance, and to effect change in height in a constant pattern related to the pattern of deceleration, there being then no variation in height during acceleration.

The invention will be more readily understood by way of example from the following description of the control of an ore unloader in accordance therewith, reference being made to the accompanying drawings in which.

Figure 1:
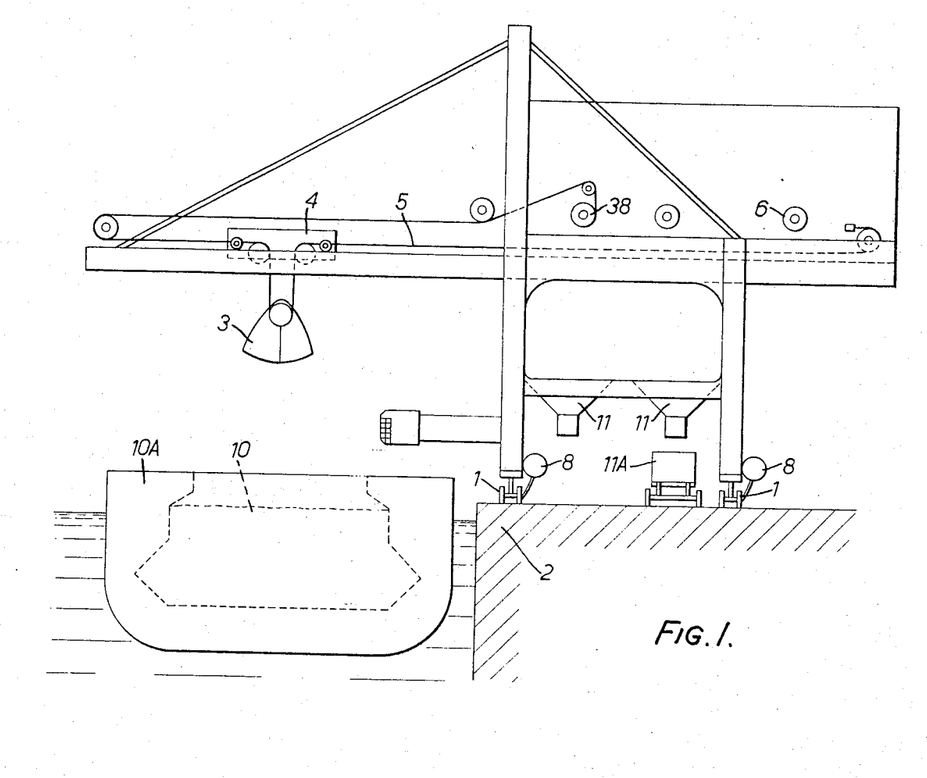
FIGURE 1 schematically illustrates the ore unloader.

The ore unloader is illustrated in FIGURE 1 as mounted on wheels 1 on tracks on a quayside 2. The grab 3 is suspended from a traveller 4 movable along a cantilevered arm 5 of the unloader. A cross traverse winch 6 controls movement of the traveller, a grab hoist winch 7 controls lowering of the grab relative to the traveller, while the long travel of the unloader as a whole on the wheels 1 is effected by long travel drives 8. The winches 6 and 7, the drives 8 and the grab closing winch are under the control of an operator in control cabin 9.

As illustrated, the ore unloader is arranged to unload ore 10 from the hold of a ship 10A adjacent the quayside 2 and to discharge the ore grabbed by grab 3 into hoppers, two of which are shown at 11. The ore may be discharged from the hoppers 11 into trucks, one of which is shown at 11A. Alternatively of course the grab may discharge on to an ore stock pile. For economy in operation, the movements of the grab between hold and the chosen hopper or stock pile must be effected as quickly as possible, compatible with safety and efficiency.

Figure 2:
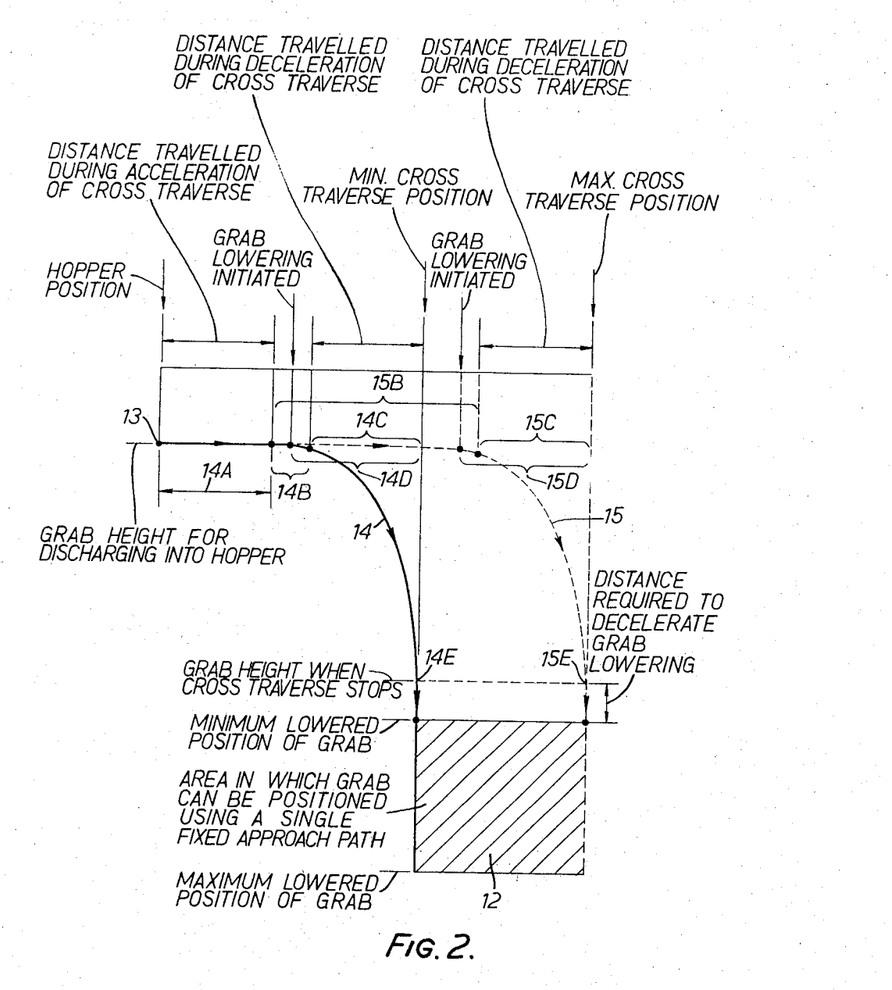
FIGURE 2 illustrates alternative paths of the unloader grab between a hopper and a ship's hold.

In FIGURE 2, the cross-hatched rectangle 12 represents the area into which the grab 3 is to be placed, the vertical dimension of the rectangle representing the possible variation in height of the ore in the hold of the ship 10A, and the horizontal dimension the accessible width of the hold parallel to the traversal of the traveller 4 along the arm 5. The grab must be capable of being placed at any point within the rectangle 12. 13 represents the position of the grab at the discharge point over the hopper one of the hoppers 11 or stock pile, the grab then being at its maximum working height.

In specification No. 12,714/63, there is described a control system for controlling the grab sequentially between the discharge point 13 and the area 12, the location of the grab within the area 12 in successive movement of the grab being controlled according to a predetermined pattern. In the present specification, the control of the grab movement between the point 13 and the area 12 in order to avoid swing of the grab will be described.

The grab is moved between the discharge point 13 and the area 12 in a family of predetermined paths, dependent upon the position the grab is required to be placed in the horizontal dimension of the rectangle 12; the line 14 represents the path of the grab to place the grab at any height in the hold at the transverse extreme of the rectangle 12 nearer the hopper, while the chain line 15 represents the similar path for the other transverse extreme. Regardless of the transverse position in the area 12, the movement from the chosen hopper to hold is initiated by the transverse acceleration of the grab in a constant acceleration pattern and at constant height; during this period 14A the transverse speed of the grab is accelerated according to the pattern to the normal running speed, so that acceleration is normally achieved over a substantially constant distance. After acceleration, the transverse movement of the grab is continued at the final speed at termination of acceleration for a period 14B or 15B dependent on the required horizontal position in the hold, i.e. horizontal variation in hold position is effected by variation of the distance travelled at constant speed, following the acceleration period. The period of running at constant speed, 14B or 15B, is followed by a period of deceleration to zero transverse speed, in a predetermined pattern so that deceleration is normally effected over a substantially constant distance, regardless of the final horizontal position in the area 12; the distances over which deceleration is effected is represented in FIGURE 2 by the distances 14C and 15C for the two extreme hold positions. At a constant transverse distance from the final horizontal position in the area 12, lowering of the grab is initiated, regardless of the required vertical position in the hold 12, the lowering distances being shown in FIGURE 2 for the two extremes at 14D and 15D. Variation in vertical position of the grab in the area 12 is effected by varying the period of lowering, after the horizontal traverse of the grab is stopped.

It will thus be seen that traversal acceleration of the grab is effected at constant height and that traversal deceleration is effected in a constant pattern accompanied by a constant rate of variation in grab height. As a result, these parts of the motion of the grab may be kept constant regardless of the final grab position, and variations in the paths 14 or 15 to suit variations in the final required position is accommodated during periods of constant traversal speed, i.e. the period of constant maximum speed 14B or 15B, or at zero speed at which the final grab height is selected.

As before mentioned, it is highly desirable that the swing of the grab, which approximates to a pendulum suspended from the traveller, be closely controlled in order to achieve accuracy in the placing of the grab at the required position in the area 12. To achieve this, the constant, predetermined, pattern of grab acceleration from the discharge position 13 is chosen for each ore unloader to result in zero swing at the end of the acceleration period. As a result, the grab starts and continues its movement with constant speed, 14B or 15B, with zero swing. Similarly, the deceleration of the grab over the distance 14C or 15C is effected over a constant predetermined pattern which is again chosen for each ore bridge to result in zero swing at the conclusion of deceleration.

Considering now in detail the acceleration of the grab through the distance 14A, the acceleration may be effected continuously to achieve maximum velocity in shortest time, compatible with the occurrence of zero swing at the end of acceleration. In this case, in order to achieve zero swing at the end of acceleration, the acceleration period is made equal to the swing period of the suspended grab, or an integral multiple of the swing period, since at the end of a natural swing period of the grab, the grab has zero angular velocity; if acceleration is not terminated at the end of a swing period, the grab is left with an angular velocity, which results in swing. However, in most cases, the time period over which acceleration must then be effected is too long for the efficient operation of the ore unloader; in other words, the requirement that there shall be zero swing at the conclusion of acceleration forces a low rate of acceleration on the traversal motion of the grab. In order to decrease the overall time for traversal acceleration of the grab, acceleration is effected in two bursts or periods of acceleration, separated by an interval of running at constant speed or at an acceleration differing from the acceleration subsisting during the acceleration periods, or at a deceleration. In this case, the rate of acceleration during the acceleration periods can be made much greater than when the acceleration is effected continuously, and the overall time for acceleration is decreased. In order to achieve zero swing at the conclusion of the final acceleration period, the length of the interval between the acceleration periods and the acceleration or deceleration, if any, during the interval are preselected in accordance with the acceleration during the acceleration periods and the swing period of the grab, in such manner that, at the end of the final acceleration period, the grab has zero angular velocity, and hence continues at the subsequent constant traversal speed, with zero swing. This preselection is based approximately on prior calculation, but with final selection made in accordance with observations made with the ore unloader in operation.

Turning now to the deceleration of the traveller traverse, the lowering of the grab, as before mentioned, during the deceleration distance, 14C or 15C, is effected in a constant pattern, regardless of the final required position of the grab within the area 12. Therefore, although the length of the pendulum formed by the grab varies during deceleration, it varies in a manner which is constant. Deceleration is then effected in two bursts or periods at controlled rate. The deceleration periods are separated by an interval of constant speed running, or of differing deceleration, or of acceleration, the timing of the interval being selected as before by calculation, but primarily observation, in relation to the lowering pattern and the speed characteristic during the interval, to result in zero swing at the end of the deceleration period, i.e. from the point at which the grab is lowered vertically to the final position within the hold.

Concerning the lowering of the grab, it has already been noted that traversal acceleration must be concluded before any lowering occurs unless the cross traverse distance is constant when lowering may start before the end of the acceleration period. In addition, to ensure the same lowering pattern on each movement of hopper to hold, the grab must be lowered in a selected speed pattern and must still be descending at a predetermined speed when the traverse reaches its final position at 14E or 15E in the case of the two extreme paths. The height at which the traverse ends above the upper extremity of the area 12 must be at least the distance required to decelerate the lowering of the grab, so that the grab may come to rest when required at the upper vertical limit position of the hold. If a lower final position within the area 12 is required, the period of predetermined lowering speed is appropriately continued.

During the return of the grab from the hold to the hopper discharge position 13, the grab follows a similar path as for the outward journey and the critical conditions are the same, i.e. that during traversal acceleration and deceleration the control of the height and lifting speed of the grab shall be constant regardless of the starting position in the area 12 and that there should be zero swing at the conclusion of traversal acceleration and traversal deceleration. For this purpose, the grab is caused to ascend at fixed speed before the cross traverse is initiated. The traversal acceleration is effected as before in two periods of acceleration separated by the interval of constant velocity or different acceleration or deceleration, the interval being preselected as before to result in zero swing at the end of acceleration. Acceleration is followed by a period of constant running traversely, dependent on the horizontal starting position of the grab within the area 12. Finally the deceleration of the traversal motion of the grab is initiated a fixed distance from the discharge point 13 and is effected in two spaced deceleration periods at constant deceleration rate, to result in zero swing of the grab when the grab finally comes to rest at position 13.

Figure 3:
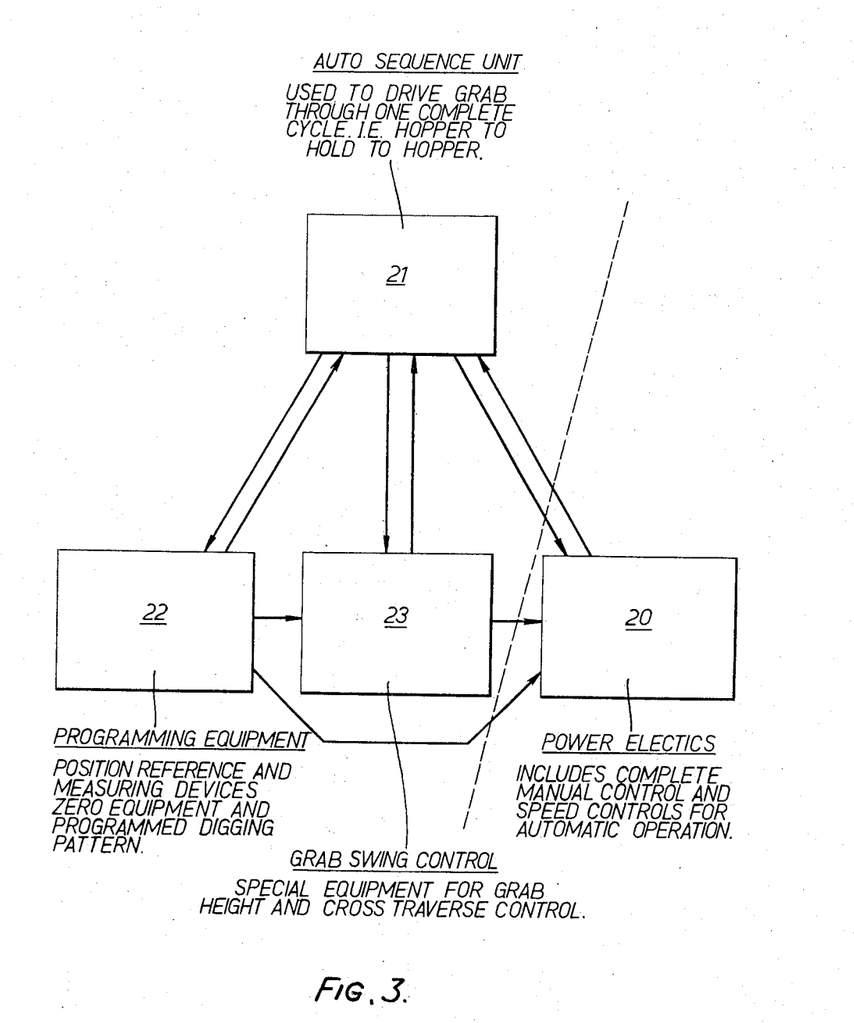
FIGURE 3 illustrates the control units.

FIGURE 3 illustrates in block form the control equipment for the entirely automatic operation of the ore unloader through a series of reciprocations between hold and hopper. The block 20 represents the power electrics for the ore bridge unloader and includes all motors and electrical control equipment required to operate the bridge manually and automatically. The automatic sequence unit 21 supplies the commands to effect each cycle of operation of the ore unloader, i.e. movement of the grab from hopper to hold to hopper. The unit 21, in turn, is controlled by programming equipment 22 which includes ore position reference and measuring devices and equipment for effecting a programme of digging cycles according to a predetermined pattern. On each cycle, the equipment 22 controls the unit 21 to effect the movement of the grab from the hopper to a predetermined position in the hold and to return it to the hopper. The unit 21 and the programming equipment 22 are described in greater detail in specification No. 12,714/63. Finally, there is the grab swing control equipment 23 for effecting each movement of the grab from hopper to hold and vice versa in the manner described in relation to FIGURE 2. The control equipment 23 is controlled by the measuring devices of the programming equipment 22 and the commands issued by the automatic sequence unit 21 to control the power electrics as required. The grab control 23 is shown in greater detail in FIGURE 5.

Figure 4:
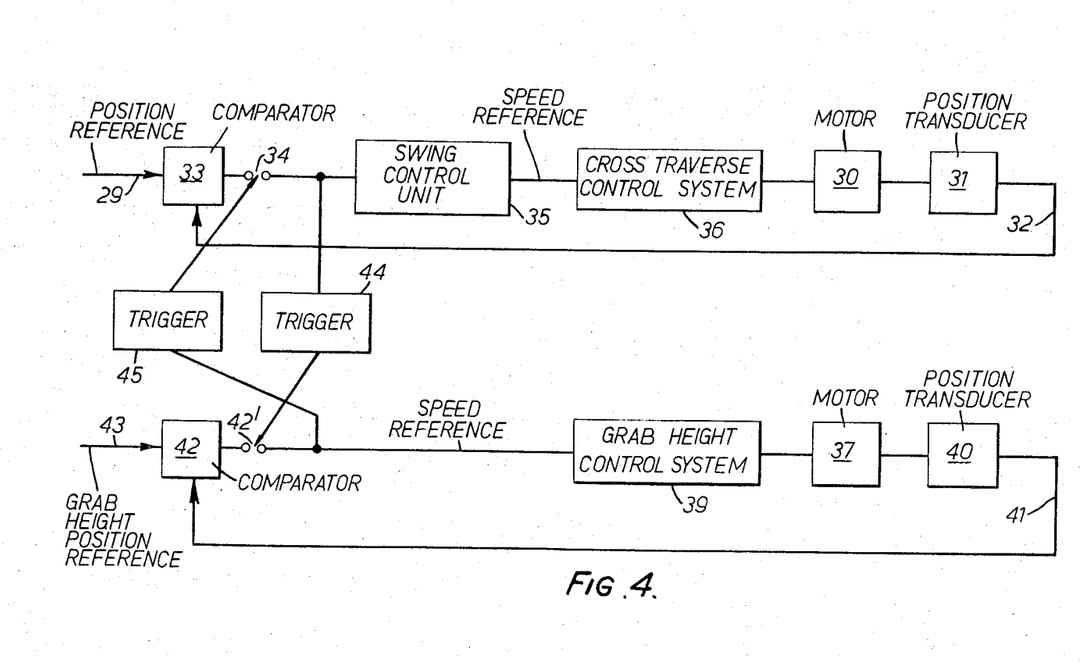
FIGURE 4 is a block diagram of the control system for preventing swing.

In FIGURE 4, the motor 30 of the cross traverse winch 6 (FIGURE 1) has coupled to it a position transducer 31 which emits on line 32 an electrical signal representing the cross traverse position of the traveller 4 and hence of the grab 3. This signal is applied to a comparator circuit 33 which compares the signal with a reference signal applied on line 29 and representing the terminal traverse position required for the grab—the dig position in the hold or the selected hopper 11, depending on the direction of movement. An error signal representing the difference between the required position and the actual position of the grab is applied by circuit 33 through contacts 34 to a swing control unit 35 which controls the cross traverse speed according to the preselected pattern and which is shown in detail in FIGURE 5. The output speed signal from unit 35 is applied in turn to the control system 36 for the winch motor 30.

There is a separate position control system for the height of grab 3, consisting of a motor 37 for the grab hoist winch 38 (FIGURE 1). Motor 37 is controlled by its control system 39 and is coupled to a position transducer 40, which applies a signal on line 41 to another comparator circuit 42, supplied with a reference signal on line 43. This reference signal represents the terminal height required for the grab, i.e. the digging depth in the hold or the operating grab height during the part 14A of the grab movement to the hoppers 11. The digging depth may be predetermined or the reference signal on line 43 may be modified when the grab comes in contact with the ore in the hold to bring the grab to rest. The height error signal from circuit 42 is applied through contacts 42′ to the control system 39 and controls the speed of motor 37.

Contacts 42′ in the height control circuit are operated by a trigger 44 fed with the traverse position error signal from circuit 33 so that the contacts are closed, and the grab lowering initiated at a fixed traversal distance from the terminal position in the hold i.e. at distance 14D or 15D (FIGURE 2). Similarly, on the movement from hold to hopper, contacts 34 are closed by a trigger 45 fed by the height error signal when a fixed height has been achieved i.e. 14E or 15E of FIGURE 2.

Figure 5A:
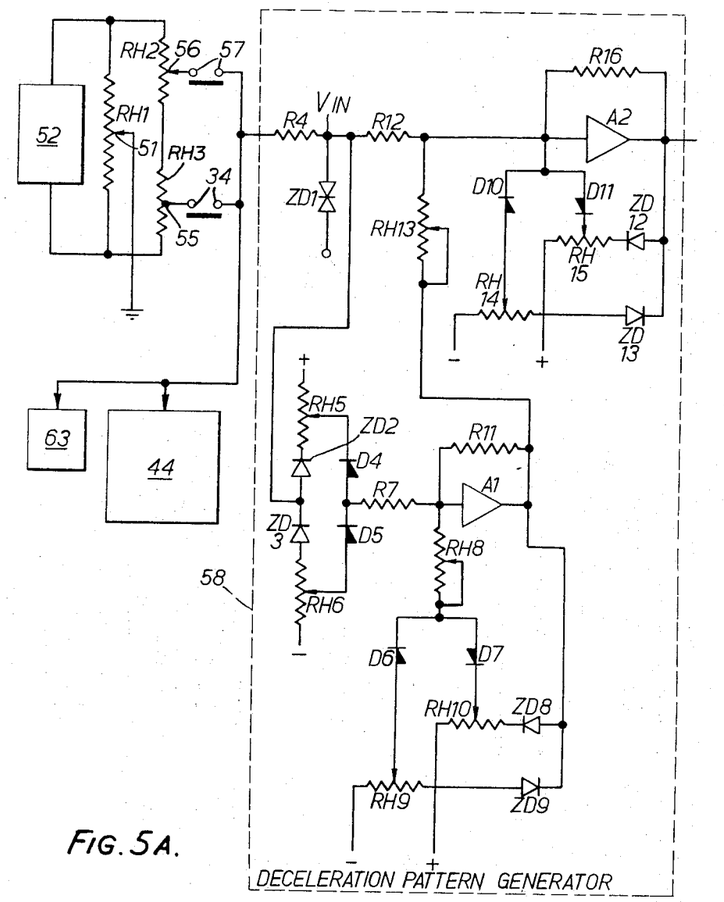
FIGURES 5A and 5B show circuit diagrams for the control of acceleration and deceleration.

In FIGURE 5A, the transducer 31, circuit 33 and the source of the reference signal on line 29 are illustrated by potentiometer 51, which is supplied with direct current from a power pack 52 and which is coupled through a gear box to the motor 30, and by two further potentiometers RH2, RH3 which are connected in series with each other and in parallel with potentiometer 51. Potentiometer 54 has a fixed tapping 55 set according to the traverse position of the hopper, while potentiometer RH2 has an adjustable slider 56 which is adjusted to the required traversal position in the area 12 (FIGURE 2); slider 56 is set on each cycle by the programming equipment 22 (FIGURE 3). If there are more than one hopper 11, there are a corresponding number of tappings 55 any of which may be selected according to the hopper to be used. The slider of potentiometer 51 is grounded and the voltages appearing on the tapping 55 and the slider 56 then represent the errors between the traversal position of the grab and the hopper discharge position and the final traversal position in the area 12, respectively.

Tapping 55 and contact 56 are respectively connected through contacts 34 and through further contacts 57 to a deceleration pattern generator circuit 58 and to the trigger 44 arranged to initiate the lowering of the grab. The output from the deceleration control circuit 58 is connected through contacts 59 to an acceleration pattern generator circuit 60, the output of which is applied to the cross traverse speed control 36 (FIGURE 4). An alternative path connected to the output of the deceleration pattern generator circuit 58 passes through an amplifier A4 and contacts 61 to the input of an amplifier A6 of the acceleration control circuit 60.

Figure 6:
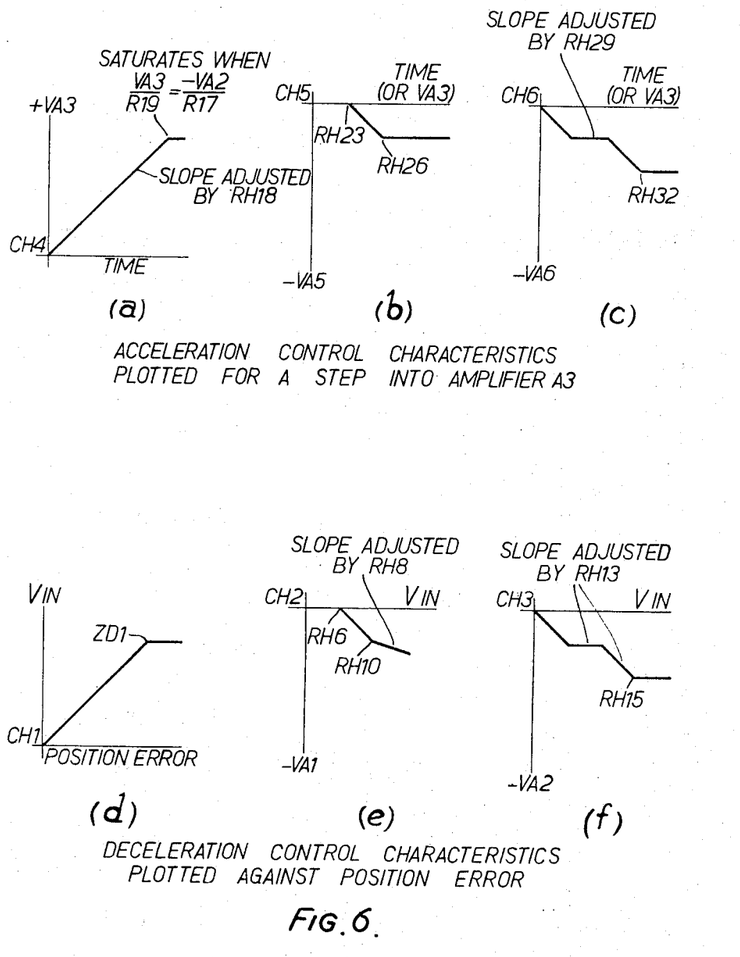
FIGURES 6(a) to 6(f) are curves representing the variation of various parameters of the circuits of FIGURES 5A and 5B.

To move the grab from the hopper to the hold, contacts 57, 59 and 62 are closed by the automatic sequence unit 21. The closing of contacts 57 causes the voltage on slider 56 representing the error between the cross traversal position and the final traversal position in the hold to be applied to the input of control circuit 58. This large error signal drives amplifier A1, A2 of control circuit 58 into saturation and results in a negative voltage being applied through the closed contacts 59 and the resistor R17 to the input of amplifier A3. This amplifier A3 is designed, when an input is applied to it, to produce an output voltage which ramps upwardly with time, as indicated in FIGURE 6(a), until the output voltage equals the input voltage, the resistances of R17 and R19 being equal. The output of A3 is applied through contacts 62 to amplifiers A5, A6 in parallel. The circuit at the input of amplifier A5 prevents any output until the voltage at the input achieves a predetermined level set by the settings of potentiometers RH22 and RH23 and the Zener diodes ZD17 and ZD18. When that level has been reached, current flows through R24 to operate amplifier A5, the output from which then rises until it is saturated by its output limit circuit; the output of amplifier A5, plotted against the output from A3 or against time, as the output from amplifier A3 varies linearly with time, is shown in FIGURE 6(b). The output of amplifier A5 is negative when the output from amplifier A3 is positive, so that when the two outputs are added in amplifier A6, there is produced the characteristic shown in FIGURE 6(c), having two parts linearly increasing with time, separated by a part at constant voltage. The output of amplifier A6, when applied to the speed control system 36 for the cross traverse of the grab therefore produces two periods of acceleration at equal rates, separated by an interval of constant running. If the slope of the characteristic of FIGURE 6(b) is made to differ from that of FIGURE 6(a), the second part of the characteristic of FIGURE 6(c) will not be horizontal, and the pause of constant speed running will be replaced by an interval of acceleration differing from those of the acceleration periods by an interval of deceleration.

When the acceleration has been concluded and at a present traversal distance from the required final position in area 12, the voltage on slider 56 causes the trigger 44 to change state and initiate the grab lowering. A trigger 63 connected in parallel with trigger 44 at the same time closes contacts 61 and, after a short time delay, opens contacts 59 and 62, the time delay being provided to ensure that contact 61 closes before contacts 59 and 62 open. The opening of contacts 59 and 62 cause the acceleration circuit 60 to be disconnected, but, when contacts 61 close there is no change in the output of amplifier A6, as that amplifier is held in saturation. Although it has been stated that triggers 44 and 63 are operated at the same time, they may be arranged to operate at different times; trigger 44 may be caused to operate at any time during periods 14b, 14c, 14d and 15c whereas trigger 63 must be operated during periods 14b, 15c.

As the voltage on slider 56 falls on the approach of the grab to the required transversal terminal position, amplifier A1 and A2 operate in a manner similar to amplifier A5, A6 to produce a deceleration control characteristic causing two periods of deceleration spaced by an interval. FIGURE 6(d) indicates the variation in the input voltage to the deceleration circuit 58 with the positional error. This voltage is applied in parallel to amplifiers A1 and A2. Amplifier A1 has the characteristic indicated at FIGURE 6(e), the output voltage being plotted against the input voltage to circuit 58, while FIGURE 6(f) shows the variation of the output voltage from amplifier A2, again against the input voltage to the circuit 58. FIGURE 6(f) is similar to FIGURE 6(c) and, when the output voltage is applied through amplifier A4 and amplifier A6 to the speed control system 36 for the transverse, the grab traversal is decelerated in two deceleration periods separated by an interval of constant speed running, the slopes of the two inclined parts of characteristic 6(f) being chosen to achieve equal decelerations during the two deceleration periods. As before, the interval may alternatively be at a different deceleration rate or at a small acceleration.

When the cross traverse has been brought to rest the grab is still descending at a predetermined speed as above mentioned. The grab lowering is then stopped by its own position control system illustrated in the lower part of FIGURE 4.

Figure 5B:
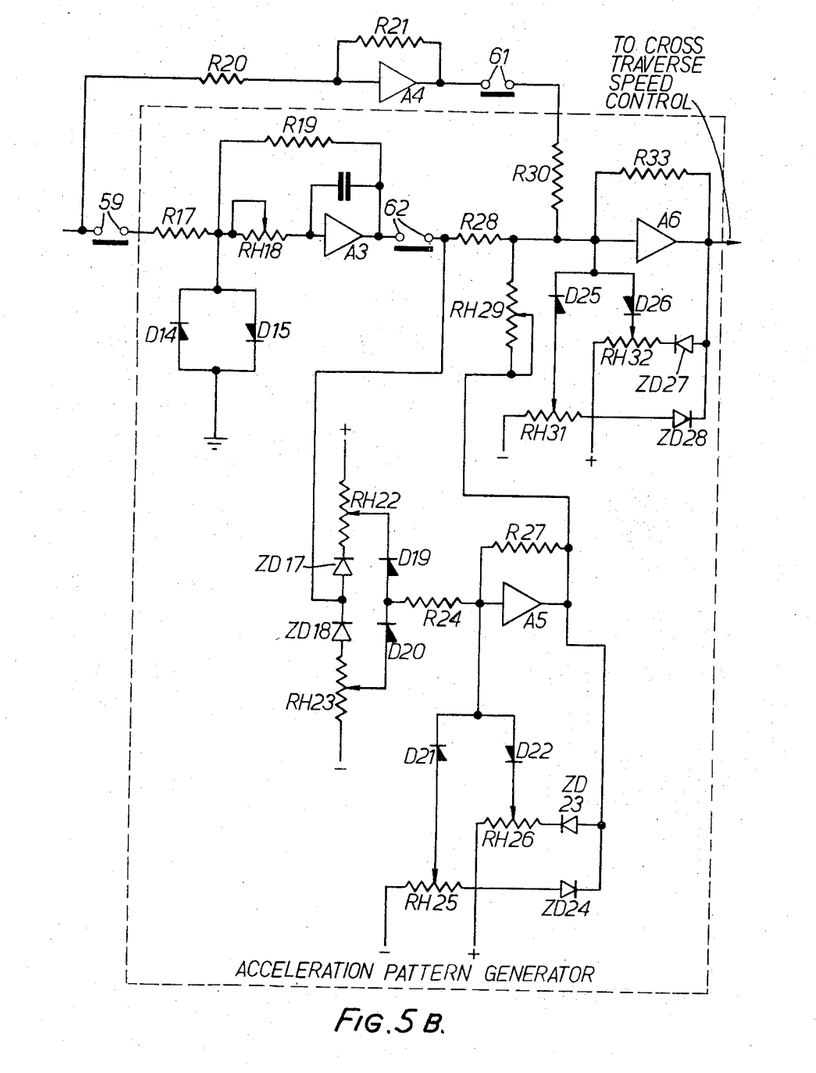

To make the return journey, i.e. from hold to hopper, the operation of the circuit of FIGURE 5 is similar to that described, but contacts 34 are closed instead of contacts 57, so that the voltage applied to the control circuit 37 represents the positional error with respect to the hopper discharge position. The automatic sequence unit 22 initiates the raising of the grab and when the grab has reached a predetermined height, the trigger 45 (FIGURE 4) closes contacts 34, as before mentioned to initiate the cross traverse and render the acceleration circuit 60 effective. The raising of the grab is terminated when the grab reaches the maximum working height under the action of the height position control system of FIGURE 4 and thereafter the traverse is decelerated under the control of the circuit 58. The acceleration and deceleration characteristics (FIGURES 6(c) and (f)) differ slightly in the two directions of motion—hopper to hold and hold to hopper. Accordingly, rheostats RH6, RH10, RH15, RH23, RH26 and RH32 are effective during the first movement and rheostats RH5, RH9, RH14, RH22, RH25 and RH31 are effective during the second movement.

In the system described, the grab follows the same path on each movement from one terminal point to another terminal point. If alternative paths are required, it is necessary to make provision for modifying the deceleration characteristic when travelling from hopper to hold and the acceleration characteristic from hold to hopper; it is unnecessary to modify the control characteristic for the portion where the grab height does not vary. To permit modifications in the deceleration characteristic when travelling from hopper to hold components ZD3, D5, RH6, D7, ZD8 and RH10 are switched out and substitute components appropriate to the new path switched in their place. Similarly for the acceleration characteristic when travelling from hold to hopper, ZD17, D19, RH22, D25, ZD28 and RH31 are switched out and replaced by substitute components.

While the control system has been described in relation to an ore unloader, it will be appreciated that it is equally applicable to other conveying devices where the holding device is suspended and the suspension point travels along a fixed path, provided that the movement of the holding device can be effected in preset patterns.

What is claimed is:
1. In the combination of
   a body,
   a supporting carriage movable along a fixed path,
   means by which said body is swingably suspended from said carriage so that its height may be changed relative to said carriage,
   a control system comprising:
   a first control means for moving said carriage along said path,
   second control means for changing the height of said body relative to said carriage,
   and automatic control means for regulating said first and second control means through a plurality of successive cycles to cause said carriage and body to come to rest at a predetermined point in each cycle substantially simultaneously without substantial swing of said body,
   the improvement according to which said automatic control means comprises:
   means for regulating said first and second control means to vary from cycle to cycle the speed and dis- tance of travel of said carriage during a period in each cycle in which the height of said body relative to said carriage is kept constant and to simultaneously vary the height of said body relative to said carriage and the movement of said carriage through a predetermined distance and in a predetermined pattern of speed change, during another period in each cycle in which the curvature of the mean path of travel of said body is thereby kept constant from cycle to cycle.

2. The combination claimed in claim 1 in which said automatic control means is arranged to accelerate said carriage from rest to a fixed running speed over a first predetermined extent of travel of said carriage along said path and to decelerate said carriage to rest from said fixed running speed over a second predetermined extent of travel whereby the difference in length of the different paths is travelled by said carriage at said running speed.

3. A combination as claimed in claim 2 wherein said automatic control means is arranged to accelerate said carriage in accordance with a pattern of acceleration which includes two periods of acceleration separated by a period during which the rate of change of speed of the carriage is different from that during either of said periods of acceleration, and which is so related to the period of swing of said suspended body that said carriage and said body attain said running speed substantially simultaneously thereby avoiding swing of said body relative to said carriage in the direction of movement of said carriage upon attaining said running speed.

4. A combination as claimed in claim 2 wherein said automatic control means is arranged to decelerate said carriage in accordance with a pattern of deceleration which includes two periods of deceleration separated by a period during which the rate of change of speed of said carriage is different from that during either of said periods of deceleration and which is so related to the period of swing of said suspended body that said carriage and body come to rest substantially simultaneously thereby avoiding swing of said body relative to said carriage at the end of movement of said carriage along said path.

5. A combination as claimed in claim 1 wherein said pattern of speed change comprises two spaced periods of acceleration or deceleration at the same rate.

6. A combination as claimed in claim 1 wherein said pattern includes a period of acceleration between said two periods of acceleration or a period of deceleration between said two periods of deceleration.

7. A combination as claimed in claim 1 wherein said pattern includes a period of constant speed travel between said two periods of acceleration or two periods of deceleration.

8. A combination as claimed in claim 1 wherein said pattern includes a period of deceleration between said two periods of acceleration or a period of acceleration between said two periods of deceleration.

9. A combination as claimed in claim 1 for controlling movement of said suspension means in alternately opposite directions along said path to position said body at a relatively high level at one end of said path and at a relatively low level at the other end of said path wherein said automatic control means is arranged to prevent lowering of said body as said carriage is accelerated from rest at said one end of said path, to initiate lowering of said body prior to deceleration of said carriage to rest at said other end of said path, and to complete hoisting of said body to said high level prior to the acceleration of said carriage from rest at said other end of said path.

10. A combination as claimed in claim 9 wherein said automatic control means is arranged periodically to vary the extent of travel of said carriage between termination of acceleration thereof and starting of deceleration thereof.

11. A combination as claimed in claim 9 wherein said automatic control means is arranged periodically to vary the extent of lowering of said body during travel along said path.

12. A combination as claimed in claim 1 wherein said suspension means comprises pulley means mounted for movement longitudinally of a beam defining said carriage path.

13. A system as claimed in claim 12 including means for selectively determining the end positions of said path relative to the ends of said beam.

14. A combination as claimed in claim 12 wherein said beam is mounted for movement in a direction perpendicular to its length to provide for lateral displacement between successively travelled paths.

15. A combination as claimed in claim 14 including means for automatically controlling the operation of said end position determining means and the lateral movement of said beam in accordance with a predetermined pattern.

16. The improvement as claimed in claim 1 in which said predetermined distance through which said height is varied is smaller than the total change in height required, and in which said automatic control means is arranged to cause said body to move vertically for the remainder of any required height change during yet another period of each cycle while the speed of travel of said carriage along said path is constant.

17. The improvement as claimed in claim 16 in which said constant speed is zero.

18. The improvement as claimed in claim 1 in which, in order to move said body from a first position along its path of travel at a first height to a second position along said path at a second height below that reached during said other period, said automatic control means is arranged to initiate changing the height of said body through the predetermined distance through which said height is varied during said other period at a preset distance from an intermediate position directly above said second position, to bring said carriage to rest without swing of said body, with said body at said intermediate position simultaneously with said body reaching the end of said predetermined height, and thereafter to change the vertical position of said body to said second position.

19. The combination claimed in claim 1 in which said automatic control means comprises means for changing the speed of said carriage from a first speed to a second speed in accordance with a pattern of speed change so related to the swing period of the suspended body that, when the carriage attains said second speed, the body is moving at substantially zero angular velocity, thereby avoiding swing of said body relative to said carriage in the direction of movement of said carriage upon attaining said second speed.

20. The combination claimed in claim 1 in which said automatic control means comprises means for automatically controlling the acceleration from rest of said carriage to a given speed in accordance with a pattern of acceleration which includes two periods of acceleration separated by a period during which the rate of change of speed of the carriage is different from that during either of said periods of acceleration, and which is so related to the period of swing of said suspended body that, when said carriage attains said given speed the body is moving at substantially zero angular velocity, thereby avoiding swing of said body relative to said carriage in the direction of movement of said carriage upon attaining said given speed.

21. The combination claimed in claim 1 in which said automatic control means comprises means for automatically controlling the deceleration to rest of said carriage from a given speed of movement along said path in accordance with a pattern of deceleration which includes two periods of deceleration separated by a period during which the rate of change of speed of said carriage is different from that during either of said periods of deceleration and which is so related to the period of swing of said suspended body that said carriage and body come to rest substantially simultaneously thereby avoiding swing of said body relative to said carriage at the end of movement of said carriage along said path.

22. The combination claimed in claim 1 in which said automatic control means comprises means for automatically controlling the speed of movement of said carriage to change said speed from a first speed to a second speed in such a manner that said carriage and body attain said second speed substantially simultaneously and with the same extent of travel of said suspension means along said path during said changing of speed for each of said different lengths of path.

References Cited

UNITED STATES PATENTS 2,806,610    9/1957    Goertz     212—131
2,916,162   12/1959    Gercke     212—39

FOREIGN PATENTS 1,172,413    6/1964    Germany.

ANDRES H. NIELSEN, *Primary Examiner.*